(12) United States Patent
Loew et al.

(10) Patent No.: US 11,014,487 B2
(45) Date of Patent: May 25, 2021

(54) DIVIDER ASSEMBLIES FOR PARTITIONING VEHICLE CARGO SPACES

(71) Applicant: FORD GLOBAL TECHNOLOGIES, LLC, Dearborn, MI (US)

(72) Inventors: Pattrick Loew, Dearborn, MI (US); Kendra White, Redford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 324 days.

(21) Appl. No.: 15/806,821

(22) Filed: Nov. 8, 2017

(65) Prior Publication Data

US 2019/0135164 A1 May 9, 2019

(51) Int. Cl.
| | | |
|---|---|---|
| *B60P 7/14* | (2006.01) | |
| *B60R 5/04* | (2006.01) | |
| *B60R 5/00* | (2006.01) | |
| *B62D 33/02* | (2006.01) | |

(52) U.S. Cl.
CPC ........ *B60P 7/14* (2013.01); *B60R 5/00* (2013.01); *B60R 5/04* (2013.01); *B62D 33/02* (2013.01)

(58) Field of Classification Search
CPC .......... B60P 7/14; B60P 3/205; B60P 7/0892; B60P 7/135; B60P 7/15; B60P 3/40; B60P 7/0876; B62D 33/0273; B62D 33/02; B62D 33/027; B62D 33/042; B62D 33/08; B62D 25/2054
USPC ... 410/129, 130, 140, 121, 135, 118, 38, 42, 410/46, 32, 80, 97, 155, 44, 92, 91, 82; 296/24.4, 24.41, 39.2, 26.08, 43, 186.1
See application file for complete search history.

(56) References Cited

U.S. PATENT DOCUMENTS

| | | | | |
|---|---|---|---|---|
| 4,173,369 A | * | 11/1979 | Roggin ................... | B60R 21/12 296/24.46 |
| 4,227,735 A | * | 10/1980 | Joyner .................... | B60R 21/12 109/9 |
| 5,586,850 A | * | 12/1996 | Johnson .................... | B60P 7/14 410/129 |
| 6,138,883 A | * | 10/2000 | Jackson .................... | B60R 9/00 224/404 |
| 6,543,975 B2 | | 4/2003 | Kopperud | |
| 6,547,298 B2 | * | 4/2003 | Sotiroff .................... | B60J 5/047 280/748 |
| 6,582,169 B1 | | 6/2003 | Cano-Rodriguez et al. | |
| 6,685,037 B1 | * | 2/2004 | Zadak .................... | A47B 57/58 108/61 |

(Continued)

FOREIGN PATENT DOCUMENTS

KR    20130097026 A    9/2013

OTHER PUBLICATIONS

2012 Ram Truck: RamBox; http://sherrychrysler.com/2012-ram-truck-rambox, Aug. 1, 2017.

*Primary Examiner* — D Glenn Dayoan
*Assistant Examiner* — Sunsurraye Westbrook
(74) *Attorney, Agent, or Firm* — David Coppiellie; Carlson, Gaskey & Olds

(57) ABSTRACT

A divider assembly for partitioning a vehicle cargo space includes a divider body, a window extending through the divider body, and a panel movable between a first position in which the window is concealed and a second position in which the window is exposed. When the window is exposed, cargo can be inserted through the window and into the vehicle cargo space without first removing the divider body from the cargo space.

19 Claims, 7 Drawing Sheets

(56) References Cited

U.S. PATENT DOCUMENTS

| | | | |
|---|---|---|---|
| 7,017,977 B1 | 3/2006 | Kelter | |
| 7,841,815 B1* | 11/2010 | Lane | B60P 7/0807 |
| | | | 410/100 |
| 8,029,219 B2* | 10/2011 | Toutant | B61D 45/006 |
| | | | 410/129 |
| 8,556,092 B2 | 10/2013 | Valiulis et al. | |
| 8,931,987 B2 | 1/2015 | Hibbard | |
| 9,090,195 B2 | 7/2015 | Peters et al. | |
| 9,415,663 B1* | 8/2016 | Soffin | B60J 1/1853 |
| 2005/0263337 A1* | 12/2005 | Corey | B60P 3/007 |
| | | | 180/318 |
| 2007/0046071 A1* | 3/2007 | Steiger | B62D 33/042 |
| | | | 296/193.01 |
| 2008/0253857 A1* | 10/2008 | McJunkin | B60P 7/14 |
| | | | 410/132 |
| 2017/0247005 A1* | 8/2017 | Richter | B60J 1/00 |

\* cited by examiner

DIVIDER ASSEMBLIES FOR PARTITIONING VEHICLE CARGO SPACES

TECHNICAL FIELD

This disclosure relates to divider assemblies for partitioning vehicle cargo spaces into multiple sections for retaining cargo of various shapes and sizes.

BACKGROUND

A pickup truck is a type of vehicle that includes a truck bed that serves as a cargo space for transporting various types of items. A divider may be positioned within the truck bed for limiting movement of cargo being carried within the truck bed. The divider partitions the truck bed into smaller sections for more adequately retaining the small cargo. Typically, the divider must be removed before positioning and carrying long stock cargo items within the truck bed.

SUMMARY

A divider assembly for partitioning a vehicle cargo space according to an exemplary aspect of the present disclosure includes, among other things, a divider body, a window extending through the divider body, and a panel movable between a first position in which the window is concealed and a second position in which the window is exposed.

In a further non-limiting embodiment of the foregoing assembly, the panel is slidable between the first position and the second position.

In a further non-limiting embodiment of either of the foregoing assemblies, the panel is pivotable between the first position and the second position.

In a further non-limiting embodiment of any of the foregoing assemblies, the panel is received within a pocket inside the divider body in the second position.

In a further non-limiting embodiment of any of the foregoing assemblies, the panel is slidable along an exterior surface of the divider body.

In a further non-limiting embodiment of any of the foregoing assemblies, a handle is connected to the panel.

In a further non-limiting embodiment of any of the foregoing assemblies, the handle includes a shaft that extends through a slot formed in the divider body.

In a further non-limiting embodiment of any of the foregoing assemblies, the shaft is threadably received by a fix plate disposed within the divider body.

In a further non-limiting embodiment of any of the foregoing assemblies, the handle is rotatable in a first direction to tighten the panel within a channel of the divider body and is rotatable in a second direction to loosen the panel within the channel.

In a further non-limiting embodiment of any of the foregoing assemblies, a second panel is movable to expose a second window.

In a further non-limiting embodiment of any of the foregoing assemblies, the first panel at least partially overlaps the second panel when moved to the second position.

In a further non-limiting embodiment of any of the foregoing assemblies, the panel is connected to the divider body by a hinge.

In a further non-limiting embodiment of any of the foregoing assemblies, the panel pivots about a vertical pivot axis of the hinge.

In a further non-limiting embodiment of any of the foregoing assemblies, the panel pivots about a horizontal pivot axis of the hinge.

A vehicle according to another exemplary aspect of the present disclosure includes, among other things, a cargo space and a divider assembly positioned to partition the cargo space into multiple sections. The divider assembly includes a divider body, a window formed through the divider body, and a panel that is slidable or pivotable to selectively expose the window for receiving an item of cargo.

In a further non-limiting embodiment of the foregoing vehicle, the cargo space is established by a truck bed.

In a further non-limiting embodiment of either of the foregoing vehicles, the item of cargo is a long stock cargo.

In a further non-limiting embodiment of any of the foregoing vehicles, the panel is slidable or pivotable between a first position in which the window is concealed behind the panel and a second position in which the window is exposed.

In a further non-limiting embodiment of any of the foregoing vehicles, a second divider assembly is positioned to further partition the cargo space.

A method according to another exemplary aspect of the present disclosure includes, among other things, partitioning a vehicle cargo space with a divider assembly, moving a panel of the divider assembly to expose a window, and inserting an item of long stock cargo through the window and into the vehicle cargo space.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details divider assemblies for partitioning vehicle cargo spaces. An exemplary divider assembly includes a divider body, a window extending through the divider body, and a panel movable between a first position in which the window is concealed and a second position in which the window is exposed. Cargo can be passed through the window once it is exposed. The vehicle cargo space may be established by a truck bed or any other cargo space. The divider assemblies of this disclosure both retain cargo and allow long stock cargo to be passed through the divider without removing the divider from the vehicle. These and other features of this disclosure are described in greater detail in the following paragraphs of this detailed description.

Figure 1:
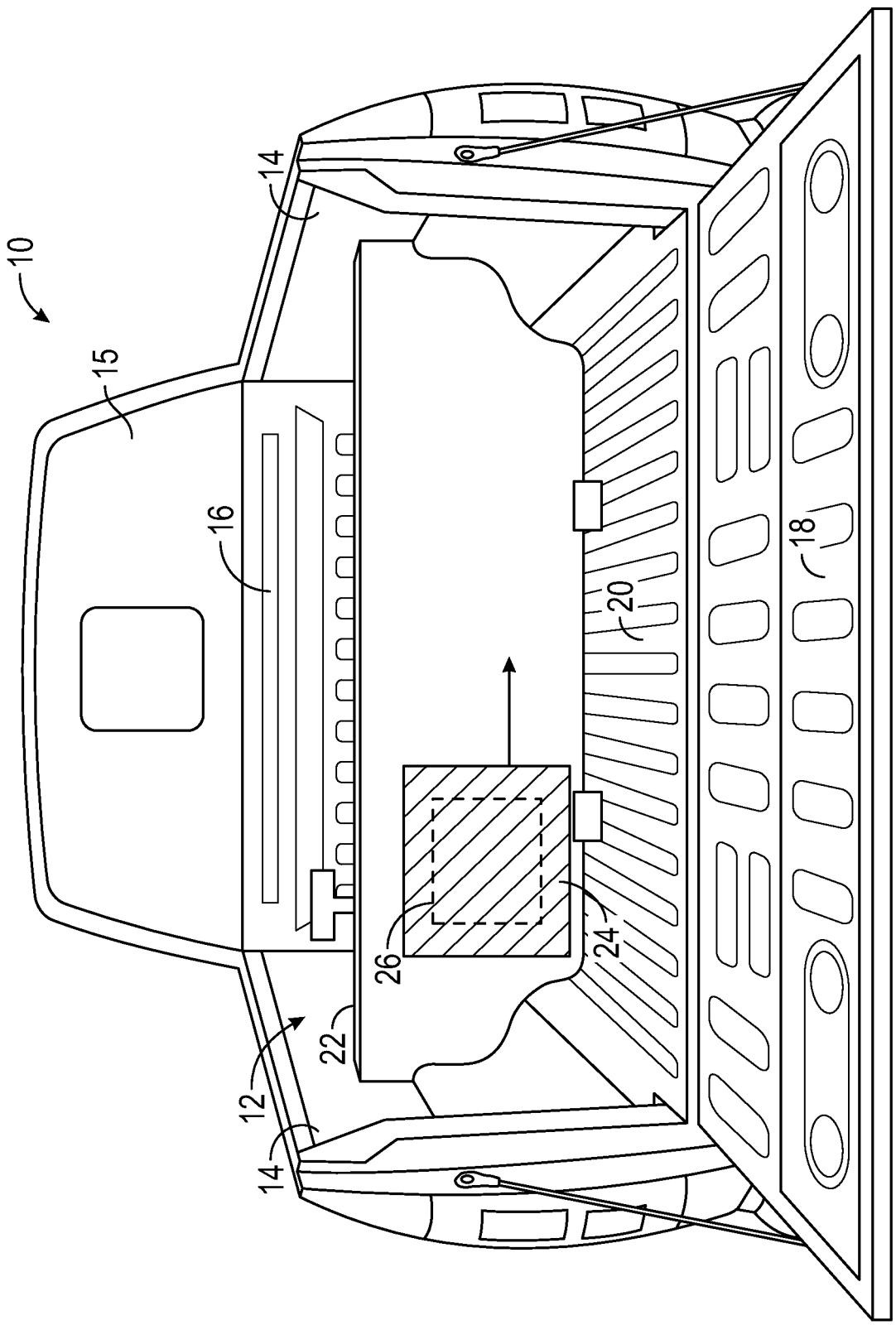
FIG. 1 illustrates a vehicle equipped with a divider assembly.

FIG. 1 schematically illustrates a vehicle 10. In the illustrated embodiment, the vehicle 10 is a pickup truck. While a truck is pictured, other vehicles could also benefit from the teachings of this disclosure. For example, the exemplary divider assemblies of this disclosure could be used to partition any vehicle cargo space.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a truck bed 12 that establishes a cargo space for storing and hauling cargo at a rear location of the vehicle 10. The truck bed 12 is generally rearward of a passenger cabin 15 of the vehicle 10 and includes a floor 20 extending between a pair of longitudinally extending side walls 14, a laterally extending front wall 16, and a tailgate 18.

The tailgate 18 is moveable between a closed position (not shown) and a deployed or open position. When in the closed position, the tailgate 18 generally encloses an end of the truck bed 12 that is opposite from the front wall 16 to prevent cargo from sliding out of the truck bed 12. The tailgate 18 may be pivoted from the closed position to the open position to provide access to the truck bed 12. When in the open position, the tailgate 18 is generally parallel to the ground such that cargo can be loaded and/or unloaded from the truck bed 12.

The owner of the vehicle 10 may desire to position a divider assembly 22 within the truck bed 12 for partitioning the cargo space into multiple sections. Partitioning the cargo space in this manner assists the owner with managing cargo of various shapes and sizes. As discussed in greater detail below, the divider assembly 22 is equipped with one or more panels 24 that are movable to expose a window 26 through which long stock cargo may be passed and positioned within the cargo space.

In this disclosure, the term "long stock cargo" is intended to denote any type of cargo that includes a length dimension that is wider than its width dimension. The long stock cargo could extend across a majority of the length of the truck bed 12, or could even be longer than the truck bed 12 (see, e.g., FIG. 14). Lumber, such as a two-by-four, is one non-limiting example of a type of long stock cargo.

Figure 2:
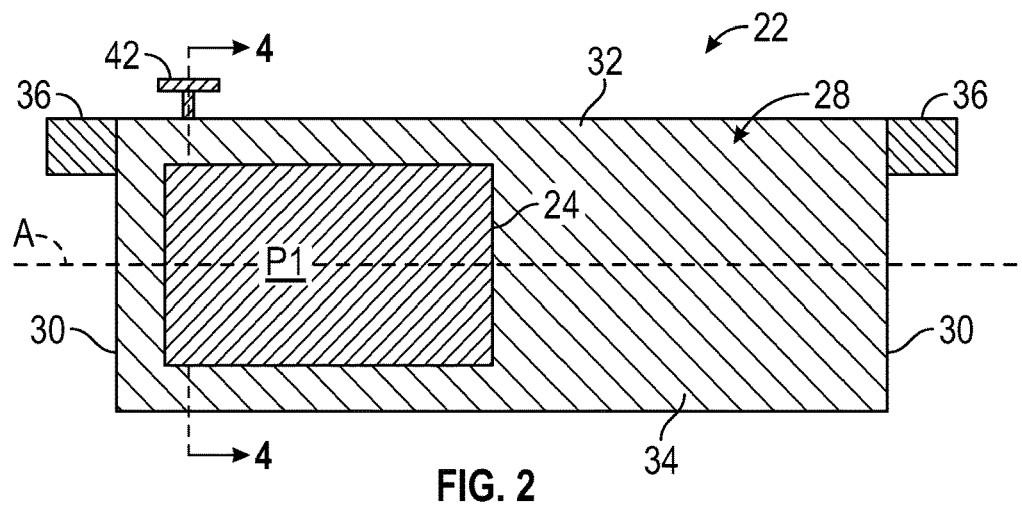
FIG. 2 illustrates a divider assembly according to a first exemplary embodiment of this disclosure.
Figure 3:
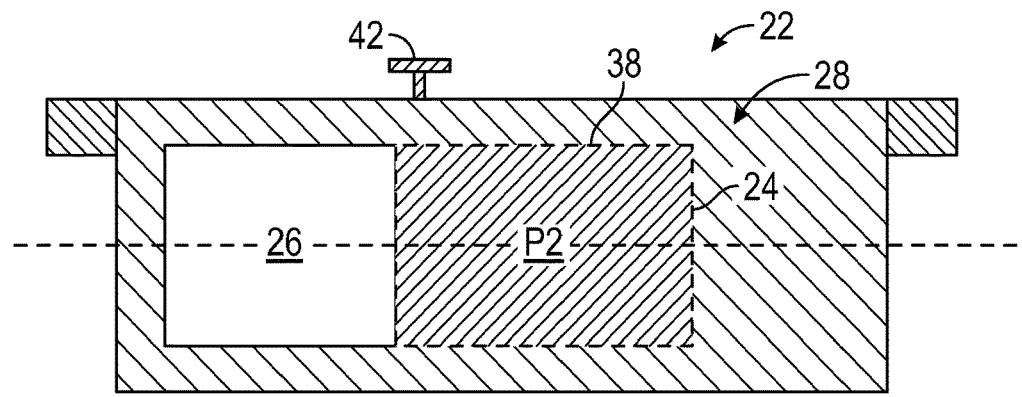
FIG. 3 illustrates the divider assembly of FIG. 2 after a panel has been moved to an open position to expose a window of the divider assembly.
Figure 4:
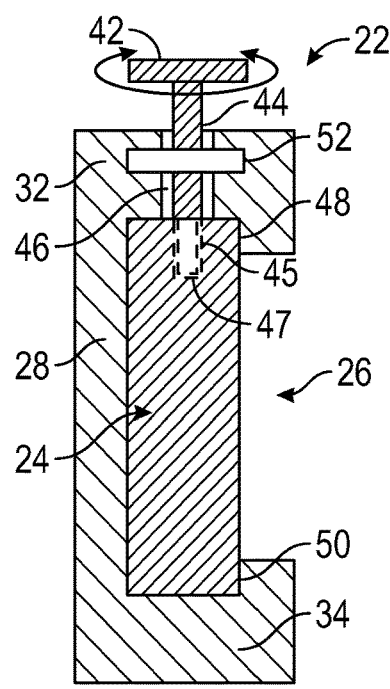
FIG. 4 is a cross-sectional view through section 4-4 of the divider assembly of FIG. 2.

FIGS. 2-4 illustrate a first exemplary divider assembly 22 for partitioning a vehicle cargo space. The divider assembly 22 may include a divider body 28 that extends along a longitudinal axis A between opposing side walls 30. An upper surface 32 and a lower surface 34 extend between the opposing side walls 30. In an embodiment, the divider body 28 is generally rectangular and is sized to extend between the side walls 14 of the truck bed 12. However, the size and shape of the divider body 28 are not intended to limit this disclosure.

In an embodiment, the divider assembly 22 includes a pair of box link connections 36. The box link connections 36 can be used for securing the divider assembly 22 to the side walls 14 of the truck bed 12.

Figure 5:
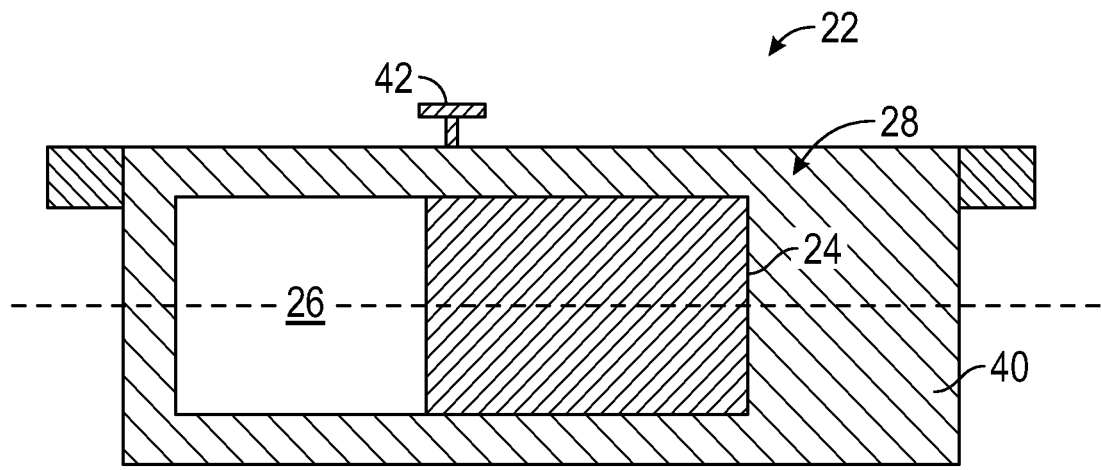
FIG. 5 illustrates a divider assembly after a panel has been moved to an open position to expose a window of the divider assembly.

A panel 24 is movably mounted within the divider body 28. The panel 24 may be moved between a first position P1 (see FIG. 2) and a second position P2 (see FIG. 3) to expose a window 26 formed through the divider body 28. Long stock cargo may be passed through the window 26 in order to accommodate the long stock cargo within the vehicle cargo space without the need to remove the divider assembly 22. In an embodiment, the panel 24 is moved into a pocket 38 formed inside the divider body 28 to expose the window 26 (see FIG. 3). In another embodiment, the panel 24 is configured to slide along an exterior surface 40 of the divider body 28 to expose the window 26 (see, e.g., FIG. 5).

A handle 42 may be positioned near the upper surface 32 of the divider body 28. The handle 42 is connected to the panel 24 and may be moved to slide the panel 24 between the first position P1 and the second position P2. By manipulating the handle 42, the panel 24 can be moved to any position between the first position P1 and the second position P2 to adjust the size of the window 26.

Referring primarily to FIG. 4, the handle 42 includes a shaft 44 that extends through a slot 46 formed in the upper surface 32 of the divider body 28. Lateral movement of the handle 42 (left or right in FIG. 3) moves the shaft 44 within the slot 46, thereby moving the panel 24 to either expose or close-off the window 26. In an embodiment, movement of the panel 24 is guided within the divider body 28 by an upper channel 48 that is disposed proximate the upper surface 32 and a lower channel 50 that is disposed proximate the lower surface 34.

The shaft 44 may be secured to the panel 24 such that movement of the handle 42 is transferred into movement of the panel 24. Fixation of the shaft 44 to the panel 24 can be achieved using any known fixation technique. In an embodiment, the shaft 44 is received within pocket 45 (see FIG. 4) formed in the panel 24.

The panel 24 may be secured in place once it has been positioned as desired. In an embodiment, the handle 42 includes a fix plate 52 for securing the positioning of the panel 24. The fix plate 52 may be press-fit within the divider body 28. The shaft 44 of the handle 42 may be threadably received into the fix plate 52 by turning the handle 42 (i.e., rotating the handle 42 in a clockwise direction). As the shaft 44 is threaded further into the fix plate 52, the force that is applied by the shaft 44 onto the panel 24 increases and forces the shaft 44 against a bottom surface 47 of the pocket 45, thus forcing the panel 24 more securely down into the lower channel 50. This force effectively secures the panel 24 in position to prevent any unintended movement.

The panel 24 can be subsequently repositioned by turning the handle 42 in the opposite direction (i.e., rotating the handle 42 is a counterclockwise direction) to decrease the amount of force applied against the panel 24 by the shaft 44. After being loosened in this manner, the handle 42 may be moved to slide the panel 24 to a new desired position.

Figure 6:
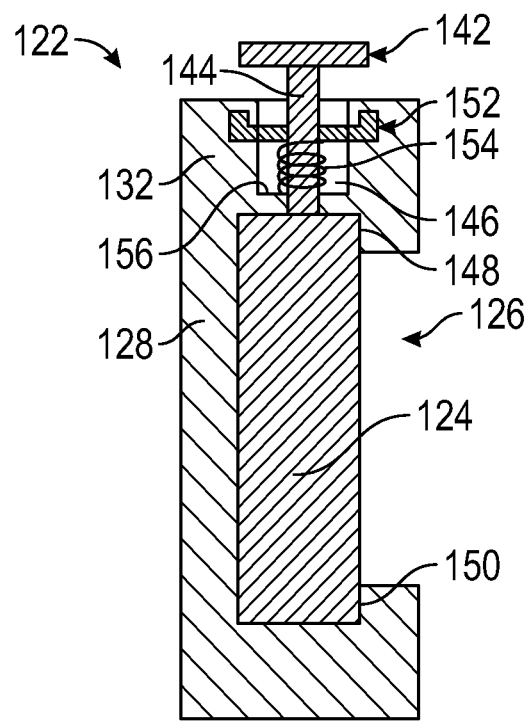
FIG. 6 is a cross-sectional view of a divider assembly according to a second embodiment of this disclosure.

FIG. 6 illustrates another exemplary divider assembly 122. The divider assembly 122 may include a divider body 128, a panel 124 that is slidable to expose a window 126, and a handle 142 for sliding the panel 124 relative to the divider body 128. The handle 142 includes a shaft 144 that extends through a slot 146 formed in an upper surface 132 of the divider body 128. Lateral movement of the handle 42 (into and out of the page as shown in FIG. 6) moves the shaft 144 within the slot 146, thereby moving the panel 124 to either expose or close-off the window 126.

In an embodiment, movement of the panel 124 is guided within the divider body 128 by an upper channel 148 and a lower channel 150. The panel 124 may be secured in place once it has been positioned as desired. In an embodiment, the handle 142 includes a fix plate 152 for securing the positioning of the panel 124. A spring 154 may extend between a floor 156 of the slot 146 and the fix plate 152. The spring 154 biases the fix plate 152 upwardly, thereby urging the panel 124 more securely into the upper channel 148 by virtue of the connection of the shaft 144 to the panel 124. This configuration allows for a more secure positioning of the panel 124 relative to the divider body 128.

Figure 7:
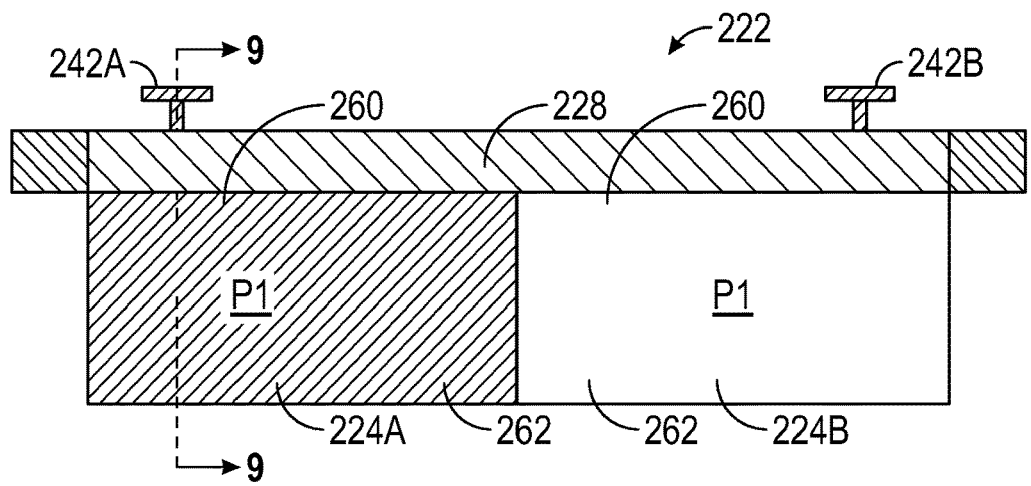
FIG. 7 illustrates a divider assembly according to a third exemplary embodiment of this disclosure.
Figure 8:
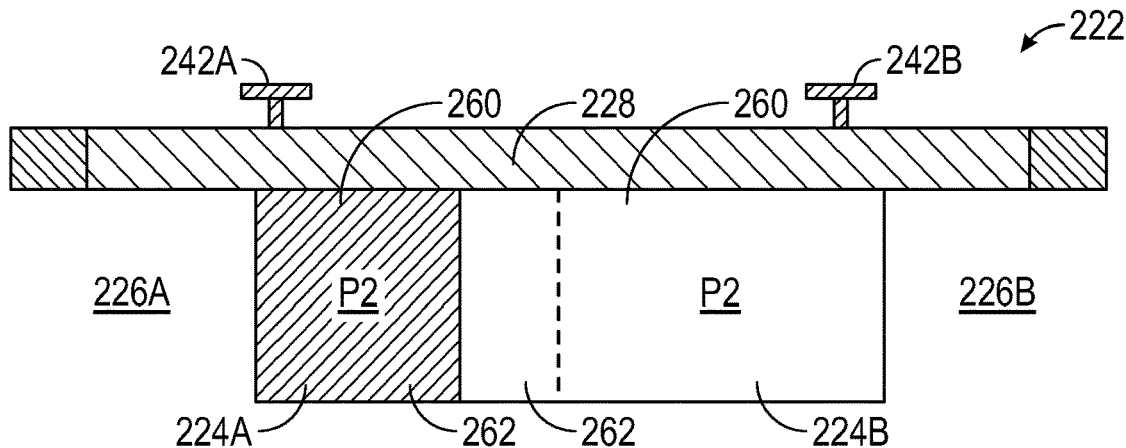
FIG. 8 illustrates the divider assembly of FIG. 7 after panels have been moved to open positions to expose windows of the divider assembly.
Figure 9:
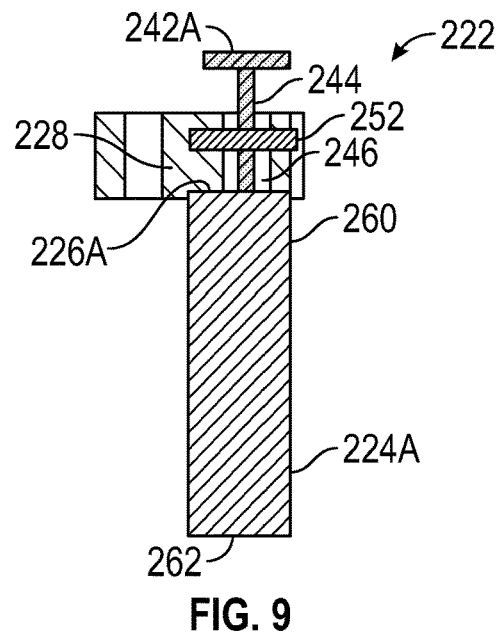
FIG. 9 is a cross-sectional view through section 9-9 of the divider assembly of FIG. 7.

FIGS. 7-9 illustrate another exemplary divider assembly 222. The divider assembly 222 of this embodiment includes a divider body 228 that may support multiple movable panels 224. For example, a first panel 224A may be moved to expose a first window 226A of the divider assembly 222, and a second panel 224B may be moved independently of the first panel 224A to expose a second window 226B of the divider assembly 222.

A handle 242A is connected to the panel 224A, and another handle 242B is connected to the panel 224B. The handles 242A, 242B may be moved to slide the panels 224A, 224B between a first position P1 (see FIG. 7) and a second position P2 (see FIG. 8). In the first position P1 the windows 226A, 226B are concealed behind the panels 224A, 224B, respectively, and in the second position P2 the windows 226A, 226B are exposed. In an embodiment, the first and second panels 224A, 224B slide over top of one another in an overlapping arrangement when moved to expose the first and second windows 226A, 226B.

In an embodiment, the divider body 228 is configured as a cross-bar. In such a configuration, upper portions 260 of the panels 224A, 224B are supported within a channel 248 of the divider body 228, whereas lower portions 262 are unbounded, and therefore unsupported, by the divider body 228. The panels 224A, 224B are therefore cantilevered in this embodiment.

Referring now primarily to the cross-sectional view of FIG. 9, the handle 242A includes a shaft 244 that extends through a slot 246 formed in the divider body 228. Lateral movement of the handle 242A moves the shaft 244 within the slot 246, thereby moving the panel 224A to expose or close-off the window 226A. Movement of the panel 224B can be achieved by a similar arrangement.

In an embodiment, each handle 242A, 242B (only the handle 242A shown in FIG. 9) includes a fix plate 252 for securing the positioning of the panel 224A, 224B relative to the divider body 228. The shaft 244 of the handle 242A, 242B may be threadably received into the fix plate 252 by rotating the handle 242A, 242B. As the shaft 244 is threaded further into the fix plate 252, the panel 224A, 224B is urged further into the channel 248, thus substantially preventing any unintended panel movements.

Figure 10:
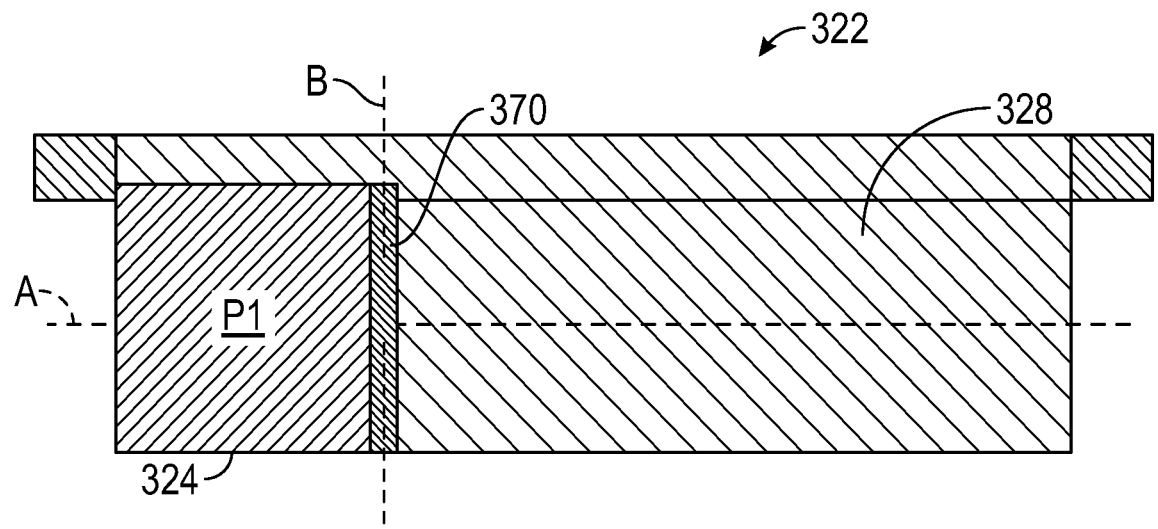
FIG. 10 illustrates a divider assembly according to a fourth exemplary embodiment of this disclosure.
Figure 11:
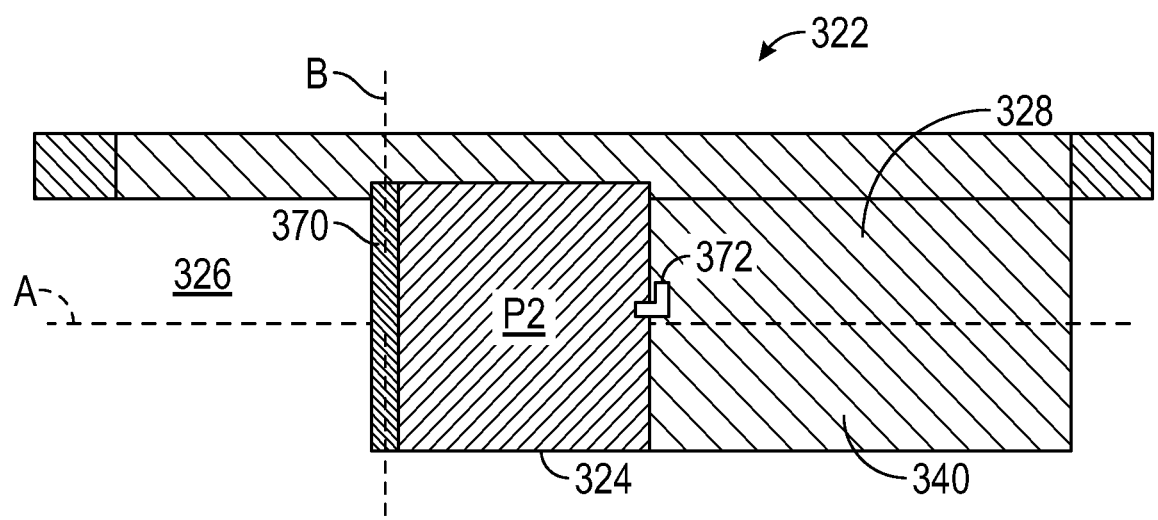
FIG. 11 illustrates the divider assembly of FIG. 10 after positioning a panel in an open position to expose a window of the divider assembly.

Another exemplary divider assembly 322 is depicted in FIGS. 10-11. In this embodiment, the divider assembly 322 includes a divider body 328, a panel 324 that is movable to expose a window 326, and a hinge 370 for pivotally connecting the panel 324 to the divider body 328. The panel 324 may be pivoted horizontally between a first position P1 (see FIG. 10) and a second position P2 (see FIG. 11) in order to expose the window 326.

The panel 324 may be pivoted about a pivot axis B when moved between the first and second positions P1, P2. In an embodiment, the pivot axis B is a vertical axis. The pivot axis B may therefore be transverse to the longitudinal axis A of the divider body 328.

When in the second position P2, the panel 324 may be folded over top of an exterior surface 340 of the divider body 328. A catch 372 may be provided on the exterior surface 340 for securing the panel 324 in the second position P2 (see FIG. 11).

Figure 12:
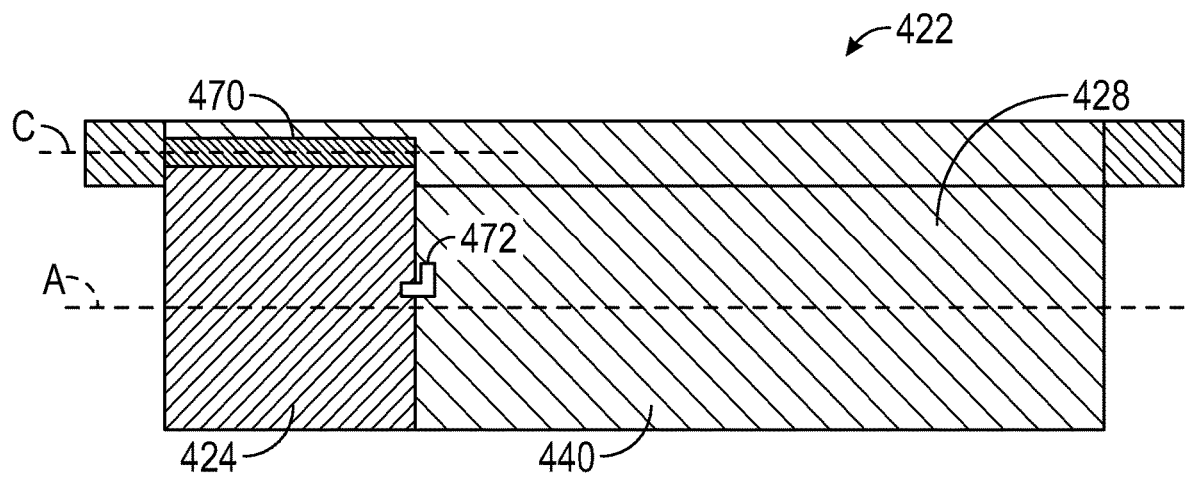
FIG. 12 illustrates a divider assembly according to a fifth exemplary embodiment of this disclosure.
Figure 13:
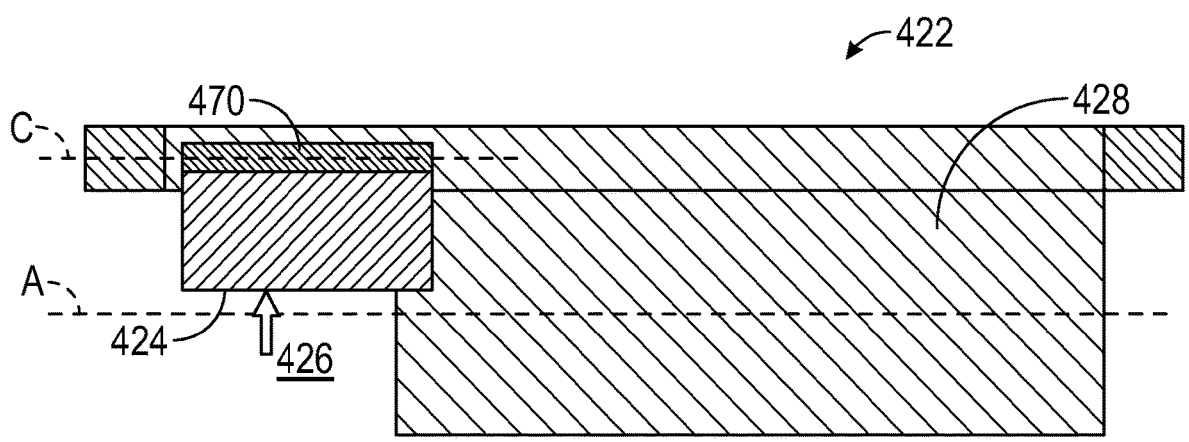
FIG. 13 illustrates the divider assembly of FIG. 12 after positioning a panel in an open position to expose a window of the divider assembly.

FIGS. 12-13 illustrate yet another exemplary divider assembly 422. The divider assembly 422 may include a divider body 428, a panel 424 that is movable to expose a window 426, and a hinge 470 for pivotally connecting the panel 424 to the divider body 428. The panel 424 may be pivoted between a first position P1 (see FIG. 12) and a second position P2 (see FIG. 13) in order to expose the window 426.

The panel 424 may be pivoted about a pivot axis C when moved between the first and second positions P1, P2. In an embodiment, the pivot axis C is a horizontal axis. The pivot axis C may therefore extend in parallel with the longitudinal axis A of the divider body 428.

A catch 472 (see FIG. 12) may be provided on the exterior surface 440 of the divider body 428 for securing the panel 424 in the first position P1. The panel 424 may rest on top of the long stock cargo after it has been passed through the window 426.

Figure 14:
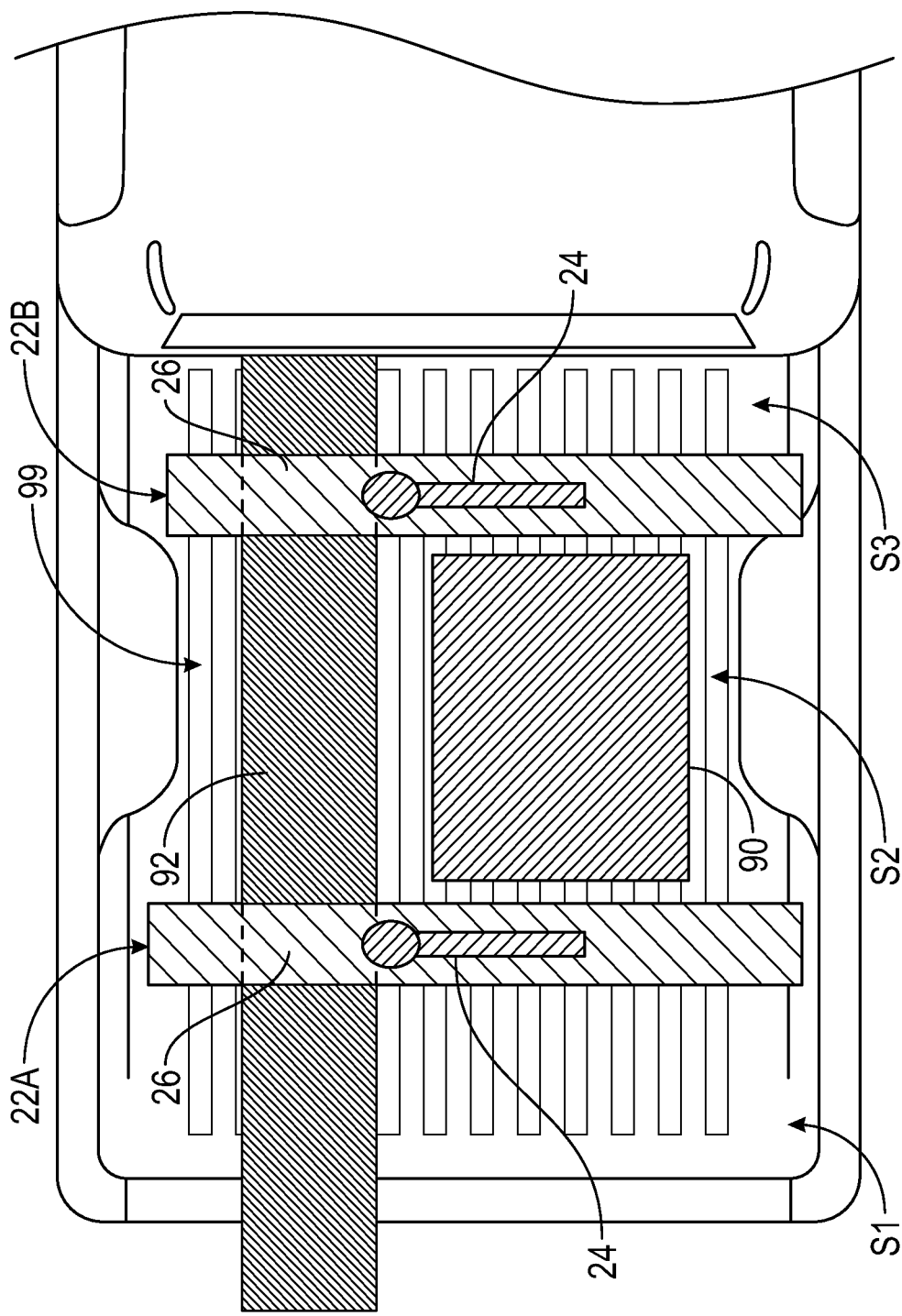
FIG. 14 schematically illustrates the use of divider assemblies for simultaneously retaining cargo and receiving long stock cargo within a vehicle cargo space.

FIG. 14 schematically illustrates the use of two divider assemblies 22A, 22B for partitioning a vehicle cargo space 99. It should be understood that a greater or fewer number of divider assemblies could be utilized to partition the vehicle cargo space 99 within the scope of this disclosure. Moreover, although the divider assemblies of this embodiment are depicted as having a design similar to that of the divider assembly 22 of FIGS. 2-4, it should be understood that any of the divider assemblies 22, 122, 222, 322, or 422 discussed herein, or any combinations of such assemblies, could be utilized in a similar manner as shown in FIG. 14 to partition the vehicle cargo space 99.

In this embodiment, a first divider assembly 22A and a second divider assembly 22B are positioned to partition the vehicle cargo space 99 into a first section S1, a second section S2, and a third section S3. A first item of cargo 90 (e.g., a non-long stock cargo item) may be retained within the second section S2, which in this embodiment is located between the first divider assembly 22A and the second divider assembly 22B. Simultaneously, after moving the panels 24 to expose the windows 26, an item of long stock cargo 92 may be inserted through the exposed windows 26 of the first divider assembly 22A and a second divider assembly 22B in order to position the long stock cargo 92 in the vehicle cargo space 99 without removing either the first divider assembly 22A or the second divider assembly 22B. The long stock cargo 92 can thus be positioned in each of the first, second, and third sections S1, S2, and S3.

The divider assemblies of this disclosure allow for simultaneous retention of both long stock cargo and non-long stock cargo within a vehicle cargo space. The divider assemblies therefore provide multiple cargo retention solutions without increasing divider complexity or customer efforts.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A divider assembly for partitioning a vehicle cargo space, comprising:
   a divider body;
   a window extending through the divider body;
   a panel movable between a first position in which the window is concealed and a second position in which the window is exposed; and
   a handle connected to the panel,
   wherein the panel is received within a pocket formed inside the divider body in the second position.

2. The assembly as recited in claim 1, wherein the handle includes a shaft that extends through a slot formed in the divider body.

3. The assembly as recited in claim 2, wherein the shaft is threadably received by a fix plate disposed within the divider body.

4. The assembly as recited in claim 2, wherein the slot is formed in an upper surface of the divider body.

5. The assembly as recited in claim 2, wherein the handle is slidable relative to the divider body to move the panel between the first and second positions.

6. The assembly as recited in claim 5, wherein movement of the panel between the first and second positions is guided inside the divider body by an upper channel and a lower channel of the divider body.

7. The assembly as recited in claim 1, wherein the handle is rotatable in a first direction to tighten the panel within a channel of the divider body and is rotatable in a second direction to loosen the panel within the channel.

8. The assembly as recited in claim 1, wherein the window includes a first height that is a least half of a second height of the divider body.

9. The assembly as recited in claim 1, wherein the panel is pivotable between the first and second positions.

10. A vehicle, comprising:
    a cargo space; and
    a divider assembly positioned to partition the cargo space into multiple sections, the divider assembly including:
    a divider body;
    a window formed through the divider body; and
    a panel that is movable to selectively expose the window for receiving an item of cargo,
    wherein the panel is received within a pocket inside the divider body when moved to expose the window.

11. The vehicle as recited in claim 10, wherein the cargo space is established by a truck bed.

12. The vehicle as recited in claim 11, wherein the divider body includes a pair of box link connections adapted for securing the divider assembly to opposing side walls of the truck bed.

13. The vehicle as recited in claim 10, wherein the item of cargo is a long stock cargo.

14. The vehicle as recited in claim 10, wherein the panel is slidable between a first position in which the window is concealed behind the panel and a second position in which the window is exposed.

15. The vehicle as recited in claim 10, comprising a second divider assembly positioned to further partition the cargo space.

16. The vehicle as recited in claim 15, wherein the second divider assembly is longitudinally spaced apart from the divider assembly within the cargo space.

17. The vehicle as recited in claim 10, wherein the pocket is bound by an upper channel and a lower channel that are each configured to guide movement of the panel inside the divider body.

18. A divider assembly for partitioning a vehicle cargo space, comprising:
    a divider body;
    a window extending through the divider body;
    a panel movable between a first position in which the window is concealed and a second position in which the window is exposed; and
    a handle connected to the panel,
    wherein the panel is pivotable between the first and second positions,
    wherein the panel is connected to the divider body by a hinge, and further wherein the panel pivots about a vertical pivot axis of the hinge to move between the first and second positions.

19. The assembly as recited in claim 9, wherein the panel is connected to the divider body by a hinge, and further wherein the panel pivots about a horizontal pivot axis of the hinge to move between the first and second positions.

* * * * *